US006415656B1

United States Patent
Bidner et al.

(10) Patent No.: US 6,415,656 B1
(45) Date of Patent: Jul. 9, 2002

(54) ONBOARD DIAGNOSTIC MISFIRE DETECTION MONITOR FOR INTERNAL COMBUSTION ENGINES

(75) Inventors: David Karl Bidner, Livonia, MI (US); Glenn Alden Zimlich, Brentwood (GB); Jerry Dean Robichaux, Riverview, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/563,644

(22) Filed: May 2, 2000

(51) Int. Cl.$^7$ .............................................. G01M 15/00
(52) U.S. Cl. .................................................... 73/117.3
(58) Field of Search ................................. 73/116, 117.2, 73/117.3, 118.1

(56) References Cited

U.S. PATENT DOCUMENTS

| | | | |
|---|---|---|---|
| 5,044,195 A | | 9/1991 | James et al. |
| 5,076,098 A | * | 12/1991 | Miwa .......................... 73/115 |
| 5,105,657 A | | 4/1992 | Nakaniwa |
| 5,127,262 A | | 7/1992 | Demizu et al. |
| 5,141,246 A | * | 8/1992 | Nakaniwa |
| 5,437,253 A | | 8/1995 | Huffmaster et al. |
| 5,460,129 A | | 10/1995 | Miller et al. |
| 5,505,077 A | | 4/1996 | Fukui et al. |
| 5,515,281 A | | 5/1996 | Palazzetti et al. |
| 5,648,602 A | | 7/1997 | Hoshina et al. |
| 5,714,673 A | | 2/1998 | Bidner et al. |
| 5,732,382 A | | 3/1998 | Puskorius et al. |
| 5,870,992 A | | 2/1999 | Kamura et al. |
| 6,158,273 A | * | 12/2000 | Jeremiasson et al. ...... 73/117.3 |

* cited by examiner

Primary Examiner—Eric S. McCall
(74) Attorney, Agent, or Firm—Allan J. Lippa

(57) ABSTRACT

A misfire monitoring method and system employ an indicated mean effective pressure (IMEP) parameter for misfire monitoring of an internal combustion engine of a vehicle. The method and system include determining displacement and torque of the engine. An indicated mean effective pressure (IMEP) parameter is then calculated for the engine. The indicated mean effective pressure (IMEP) parameter is engine torque divided by engine displacement. A misfire monitor monitors the indicated mean effective pressure (IMEP) parameter to detect misfire. The method and system include determining maximum indicated mean effective pressure (IMEP_MAX) parameter for the engine. A normalized indicated mean effective pressure (IMEP_LOAD) parameter for the engine is then calculated. The normalized indicated mean effective pressure (IMEP_LOAD) parameter is the indicated mean effective pressure (IMEP) parameter divided by the maximum indicated mean effective pressure (IMEP_MAX) parameter. Monitoring the indicated mean effective pressure (IMEP) parameter to detect misfire includes monitoring the normalized indicated mean effective pressure (IMEP_LOAD) parameter to detect misfire.

10 Claims, 2 Drawing Sheets

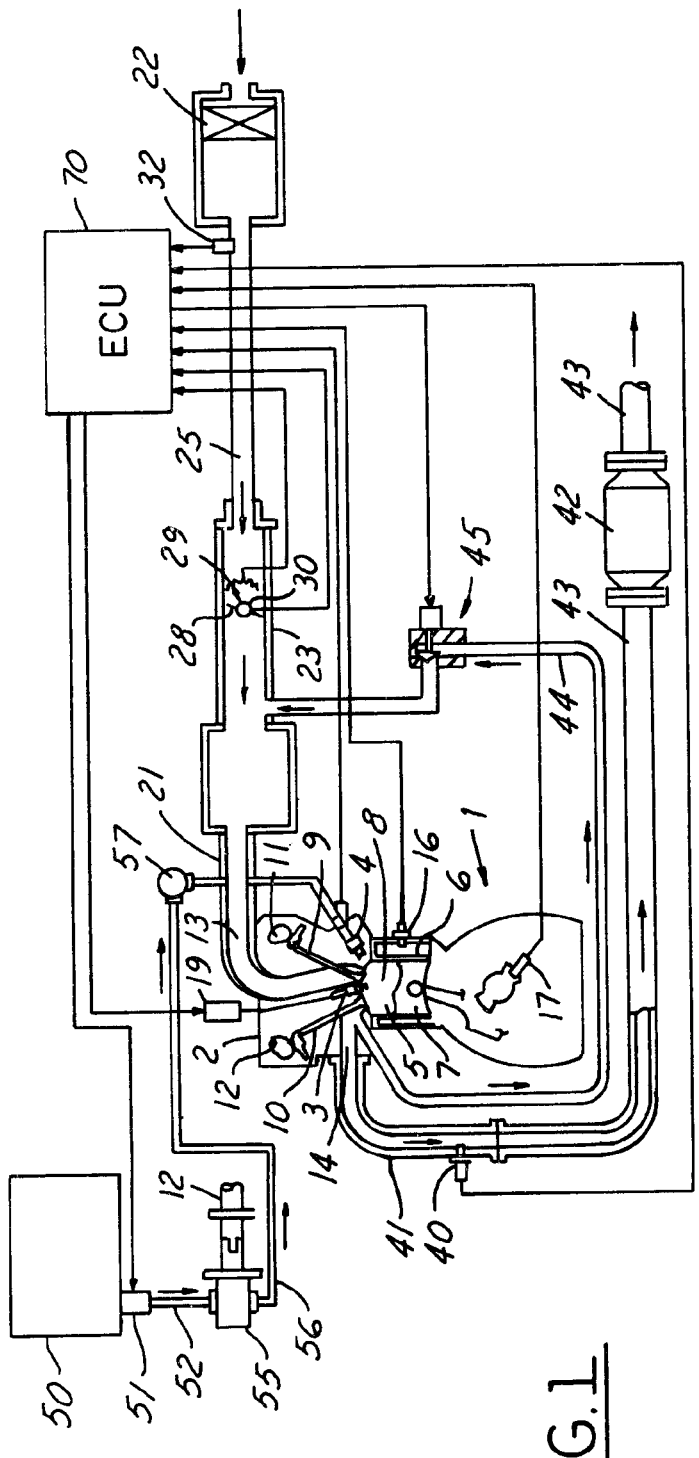

ONBOARD DIAGNOSTIC MISFIRE DETECTION MONITOR FOR INTERNAL COMBUSTION ENGINES

TECHNICAL FIELD

The present invention generally relates to misfire detection in internal combustion engines and, more particularly, to a method and system which employ an indicated mean effective pressure (IMEP) parameter for misfire monitoring of an internal combustion engine.

BACKGROUND ART

In the motor vehicle industry, a large effort is being devoted to the development of continuous, on-board monitoring of systems and components affecting vehicle tailpipe emissions. A particularly vexing situation is the diagnosis by On Board Diagnostics (OBD) of engine combustion failures, known as misfire detection. This task must be performed under virtually all operating conditions. Misfires can arise following malfunctioning of an injector, loss of spark from a spark plug, mixture too lean or to rich, and the like.

The misfire identification rates must be low as one percent and identify the event quickly so as to prevent deterioration of the emissions control system. Such a diagnostic method must operate continuously, in real time, on all vehicles, monitoring every engine cylinder combustion event. False alarm immunity is an important concern, because the consequence of exceeding the misfire limit is illumination of the malfunction light and a trip made by the driver to a repair facility. On the other hand, high misfire detection efficiency and identification accuracy is necessary to determine whether the vehicle emissions are proper.

Direct injection gasolines engines are currently being developed to increase fuel economy and thus reduce emissions. One of the advantages of direct engine architecture is the ability to run stratified combustion charges. By moving the fuel injector into the combustion chamber the fuel can be positioned precisely in the combustion chamber. This enables positioning a rich pocket near the spark plug while having a leaner charge elsewhere in the combustion chamber. Stratified combustion charges allow dimensions (or variables) to be optimized to increase fuel economy during engine operation. The ability to control air/fuel ratios (10:1 through 60:1) and combustion types (homogenous, homogenous lean, and stratified lean) can increase the fuel economy through the ability to operate in the most efficient manner at each engine operating point.

Current spark ignition engines run in the homogenous stoichiometric mode. Traditionally, this means controlling the air/fuel ratio to around 14.6:1 throughout the engine operating range. The engine load is one of the parameters used to define the engine torque output. The engine load is generally defined as a ratio of the current cylinder air charge divided by the potential maximum cylinder air charge. For an engine inducting one half of the potential maximum amount of cylinder charge, the engine load would be 0.5 or 50%. Because this parameter is a ratio, it is normalized for engine displacement. This allows a consistent value irrespective of engine displacement and calibrations from various engine displacements can be compared quickly.

The current trend from homogenous to stratified charge operation renders the engine load parameter useless. The controlling factor for engine output (or torque) is no longer the amount of air drawn into the cylinder. The controlling factor is now the amount of fuel consumed. In more convenient terms, the controlling factor for engine output is the air/fuel ratio and the combustion mode. This leads engine control system designers to develop engine torque based algorithms. The amount of engine torque desired by the driver is converted to an air/fuel ratio and an engine operating mode. These parameters (and others) can then be optimized to obtain the best fuel economy in consideration with driveability, emissions, and other factors.

New engine control algorithms provide a challenge to the misfire monitor OBD algorithm. Engine torque is currently used by the OBD algorithm to detect engine combustion misfires by comparing back to the calculated engine deceleration parameter. Current OBD algorithms use an engine speed versus engine load table to provide the output threshold to detect a misfire.

As demonstrated above, it is not possible to apply the current OBD algorithm normalization parameters. A more useful means for normalizing the detection threshold criteria across the operating region is needed.

DISCLOSURE OF INVENTION

It is an object of the present invention to provide a method and system which employ an indicated mean effective pressure (IMEP) parameter for misfire monitoring of an internal combustion engine.

Accordingly, the present invention provides a method for detecting misfire in an internal combustion engine of a vehicle. The method includes determining displacement and torque of the engine. An indicated mean effective pressure (IMEP) parameter is then calculated for the engine. The indicated mean effective pressure (IMEP) parameter is engine torque divided by engine displacement. A misfire monitor monitors the indicated mean effective pressure (IMEP) parameter to detect misfire.

Preferably, the method further includes determining maximum indicated mean effective pressure (IMEP_MAX) parameter for the engine. A normalized indicated mean effective pressure (IMEP_LOAD) parameter for the engine is then calculated. The normalized indicated mean effective pressure (IMEP_LOAD) parameter is the indicated mean effective pressure (IMEP) parameter divided by the maximum indicated mean effective pressure (IMEP_MAX) parameter. Monitoring the indicated mean effective pressure (IMEP) parameter to detect misfire includes monitoring the normalized indicated mean effective pressure (IMEP_LOAD) parameter to detect misfire.

Further according to the present invention, there is provided a system for detecting misfire in an internal combustion engine of a vehicle. The system includes means for determining displacement of the engine and means for determining torque of the engine. A processor calculates an indicated mean effective pressure (IMEP) parameter for the engine. The indicated mean effective pressure (IMEP) parameter is engine torque divided by engine displacement. A misfire monitor monitors the indicated mean effective pressure (IMEP) parameter to detect misfire.

BRIEF DESCRIPTION OF DRAWINGS

The present invention will now be described in further detail, and by way of example, with reference to the accompanying drawings, in which:

FIG. 1 illustrates an engine control system for an internal combustion engine according to the present invention;

FIG. 2 illustrates a misfire monitor system according to the present invention.

BEST MODE FOR CARRYING OUT THE INVENTION

Figure 3:
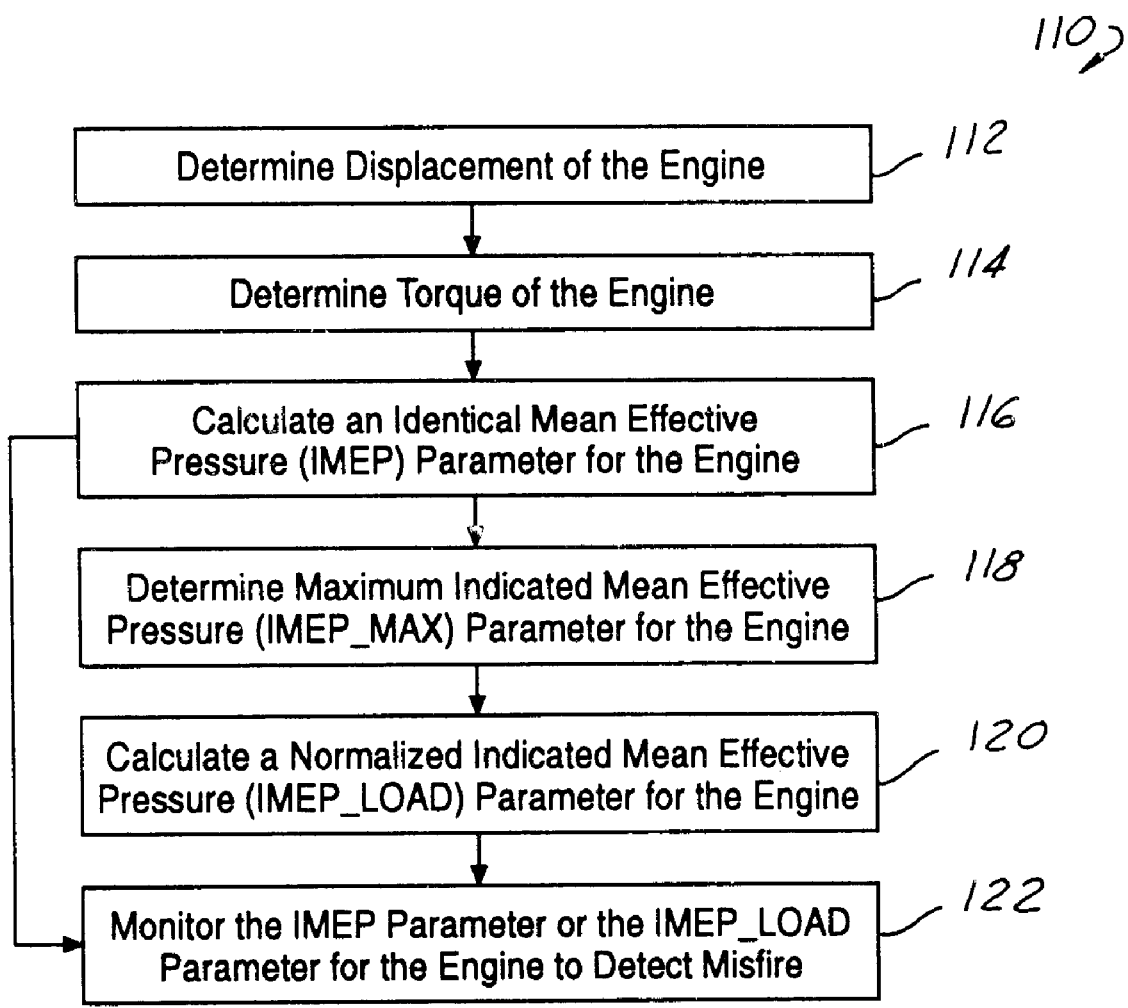
FIG. 3 illustrates a flow chart describing operation of the misfire monitor system and associated method of the present invention.

Referring now to FIG. 1, an engine control system to which the present invention is applied for an engine 1 is shown. Engine 1 is a multiple cylinder gasoline vehicle engine. Engine 1 is illustrated in FIG. 1 as a direct injection engine for exemplary purposes. The engine control system of the present invention is applicable with all types of engines.

Engine 1 includes an ignition plug 3 and a fuel injection valve 4 for each cylinder head 2. Fuel is injected from fuel injection valve 4 into a combustion chamber 5. A piston is slidably held in each cylinder 6 of engine 1. A cavity 8 is formed at the top face of piston 7 such that fuel spray injected from fuel injection valve 4 in the latter stage of the compression stroke of piston 7 may reach cavity 8.

An intake crankshaft 11 and an exhaust camshaft 12 drive an intake valve 9 and an exhaust valve 10 respectively. Intake crankshaft 11 and exhaust camshaft 12 are rotatably held in cylinder head 2. An intake port 13 extends between shafts 11 and 12 at cylinder head 2. An exhaust port 14 extends parallel to cylinder head 2.

Coolant temperature sensor 16 detects temperature of cooling water. A crank angle sensor 17 outputs a crank angle signal when each cylinder takes a predetermined crank position (for example, BTDC 5° and BTDC 75°). An ignition coil 19 supplies a voltage to ignition plug 3.

An intake manifold 21 is connected to intake port 13 and intake pipe 25. Intake pipe 25 is provided with an air flow sensor 32, an air cleaner 22, and a throttle body 23. Throttle body 23 is provided with a throttle valve 28 for opening and closing its flow path. Throttle body 23 is further provided with a throttle position sensor 29 for detecting an angle of throttle valve 28 and an idle switch 30 for detecting a fully closed state of the throttle valve. Throttle position sensor 29 outputs a throttle voltage corresponding to an angle of throttle valve 28.

Engine control unit (ECU) 70 detects the throttle voltage to determine the angle of throttle valve 28. An air flow sensor 32 detects intake air quantity. The intake air quantity may be obtained from manifold pressure in intake manifold 21.

An exhaust manifold 41 provided with oxygen sensor 40 is connected to exhaust port 14, and a catalyst 42 and an exhaust pipe 43 provided with a muffler are connected through an EGR pipe 44 to upstream portion of intake manifold 21.

A fuel tank 50 is provided in the vehicle body. Fuel stored in fuel tank 50 is pumped by a fuel pump 51 and fed through a feed pipe 52 to engine 1. The fuel supplied to engine 1 is fed from a fuel pump 55 connected with cylinder head 2 through a feed pipe 56 and a delivery pipe 57 to each of the fuel injection valves 4.

ECU 70 conducts general control of engine 1. ECU 70 includes an input-output device, storage devices (ROM, RAM, etc.) having control programs and control maps stored therein, a central processing unit (CPU), a timer control, and so forth. ECU 70 determines a fuel injection mode and fuel injection quantity based on detected information inputted from engine sensors. ECU 70 further determines ignition timing and EGR quantity to be introduced and controls driving of fuel injection valve 4, ignition coil 19, EGR valve 45, and so forth. A variety of other sensors are also connected with ECU 70.

Referring now to FIG. 2, a misfire monitor system 100 for use in conjunction with engine 1 is shown. System 100 includes means for determining engine torque 102, means for determining engine displacement 104, an indicated mean effective pressure (IMEP) calculator 106, and a misfire monitor 108. Means 102 determines engine torque by sensing at least one of engine RPM, throttle position, intake pressure, intake air mass, spark timing angle, and air/fuel ratio. The engine torque is the estimated indicated torque output by engine 1 or is an available torque desired by the driver. The torque of engine 1 is the amount of effort exerted by crankshaft 11.

Referring now to FIG. 3 with continual reference to FIG. 2, the operation of misfire monitor system 100 will be described with reference to flow chart 110. Means 104 determines the engine displacement of engine 1 from the calibration settings stored in ECU 70 as shown in block 112. The engine displacement for engine 1 is measured in units of volume such as cubic inches or liters. In general, the engine displacement of an engine depends on the size of the engine. For instance, the engine displacement depends on the geometry of the cylinders and pistons of the engine, the number of cylinders, the associated bore and stroke, and the like. The engine displacement is the sum of all of the piston displacements for each engine cylinder. Piston displacement is the volume of air displaced by a moving piston. Means 102 then determines the torque of engine 1 as shown in block 114.

IMEP calculator 106 then calculates the indicated mean effective pressure (IMEP) parameter as shown in block 116. The IMEP parameter is a parameter closely related to engine torque production. The IMEP parameter is engine torque divided by engine displacement. In engineering terms, IMEP (pounds per square inch)=(150.8*Torque (1b-ft))/(Engine Displacement (cubic inches)). In metric units, IMEP (kilo Pascal)=(0.1256*Torque (Newton*meters))/(Engine displacement (liters)).

Specifically, IMEP (pounds per square inch)=(Torque (ft-lb)*12*2*33,000)/(5252*engine displacement (cubic inches)), where 12 inches is equal to one foot, 2 revolutions is equal to one power stroke, 33,000 ft-il/minute is equal to one horsepower, and torque is equal to (33,000/(2 pounds per inch))*(horsepower/revolutions per minute).

The usefulness of the IMEP parameter is that it is generic across all engine displacements; it allows use of current OBD algorithm technology in a novel engine control system architecture; it has physical meaning and is measurable; and it has minimal impact on current calibration methodologies and technologies.

Misfire monitor 108 then analyzes the IMEP parameter (or the normalized IMEP_LOAD parameter as described later) to determine if there have been any misfires as shown in block 122. Misfire monitor 108 analyzes the IMEP parameter to look for unexpected IMEP changes or IMEP values indicative of misfires. Misfire monitor 108 analyzes the IMEP parameter in a manner similar to typical misfire monitors monitoring the load parameter for engines running in the engine load domain.

The IMEP parameter is the engine torque (either sensed or desired) converted to a normalized parameter across different engine sizes. Preferably, the IMEP parameter itself is normalized to account for the varying amounts of IMEP produced by different engines, e.g., six valve vs. four valve engines. To account for this variation, the IMEP parameter is divided by a reference parameter IMEP_MAX. The reference parameter IMEP_MAX is a unique parameter for the engine being monitored. The reference parameter IMEP_MAX is the IMEP at sea level for the engine under test and is determined as shown in block 118.

Means 106 then calculates a normalized IMEP parameter (IMEP_LOAD) for engine 1 as shown in block 120. The normalized IMEP parameter (IMEP_LOAD) ranges from 0 to 1 where IMEP_LOAD=IMEP/IMEP_MAX. Practically, IMEP is a continuously varying parameter which depends on the desired torque or measured torque and ranges from 0 to 250 pounds per square inch. IMEP_MAX is the calibration constant reflecting the maximum IMEP of the engine at sea level (about 250 pounds per square inch).

In summary, the IMEP parameter is like normalized torque. It is transferable among different engine families. It allows the existing misfire monitoring techniques for engine load based algorithms to be used with new engine torque based algorithms.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for detecting misfire in an internal combustion engine of a vehicle, the method comprising:

determining displacement of the engine;

determining torque of the engine;

calculating an indicated mean effective pressure (IMEP) parameter for the engine, wherein the indicated mean effective pressure (IMEP) parameter is engine torque divided by engine displacement;

determining maximum indicated mean effective pressure (IMEP_MAX) parameter for the engine;

calculating a normalized indicated mean effective pressure (IMEP_LOAD) parameter for the engine, wherein the normalized indicated mean effective pressure (IMEP_LOAD) parameter is the indicated mean effective pressure (IMEP) parameter divided by the maximum indicated mean effective pressure (IMEP_MAX) parameter; and monitoring the indicated mean effective pressure (IMEP) parameter to detect misfire.

2. The method of claim 1 wherein:

monitoring the indicated mean effective pressure (IMEP) parameter to detect misfire includes monitoring the normalized indicated mean effective pressure (IMEP_LOAD) parameter to detect misfire.

3. The method of claim 1 wherein:

monitoring the indicated mean effective pressure (IMEP) parameter includes monitoring changes of the indicated mean effective pressure (IMEP) parameter to detect misfire.

4. A method for detecting misfire in an internal combustion engine of a vehicle, the method comprising:

determining displacement of the engine;

determining torque of the engine;

calculating an indicated mean effective pressure (IMEP) parameter for the engine, wherein the indicated mean effective pressure (IMEP) parameter is engine torque divided by engine displacement;

determining maximum indicated mean effective pressure (IMEP_MAX) parameter for the engine;

calculating a normalized indicated mean effective pressure (IMEP_LOAD) parameter for the engine, wherein the normalized indicated mean effective pressure (IMEP_LOAD) parameter is the indicated mean effective pressure (IMEP) parameter divided by the maximum indicated mean effective pressure (IMEP_MAX) parameter; and monitoring the normalized indicated mean effective pressure (IMEP_LOAD) parameter to detect misfire.

5. The method of claim 4 wherein:

the internal combustion engine is a direct injection internal combustion engine.

6. The method of claim 4 wherein:

monitoring the normalized indicated mean effective pressure (IMEP_LOAD) parameter to detect misfire includes monitoring changes of the normalized indicated mean effective pressure (IMEP_LOAD) parameter to detect misfire.

7. A system detecting misfire in an internal combustion engine of a vehicle, the system comprising:

means for determining displacement of the engine;

means for determining torque of the engine;

a processor for calculating an indicated mean effective pressure (IMEP) parameter for the engine, wherein the indicated mean effective pressure (IMEP) parameter is engine torque divided by engine displacement, wherein the processor calculates a maximum indicated mean effective pressure (IMEP_MAX) parameter for the engine and a normalized indicated mean effective pressure (IMEP_LOAD) parameter for the engine, wherein the normalized indicated mean effective pressure (IMEP_LOAD) parameter is the indicated mean effective pressure (IMEP) parameter divided by the maximum indicated mean effective pressure (IMEP_MAX) parameter; and a misfire monitor for monitoring the indicated mean effective pressure (IMEP) parameter to detect misfire.

8. The system of claim 7 wherein:

the internal combustion engine is a direct injection internal combustion engine.

9. The system of claim 7 wherein:

the misfire monitor monitors the normalized indicated mean effective pressure (IMEP_LOAD) parameter to detect misfire.

10. The system of claim 7 wherein:

the misfire monitor monitors changes of the indicated mean effective pressure (IMEP) parameter to detect misfire.

* * * * *